US011047568B2

(12) United States Patent
Andersson et al.

(10) Patent No.: US 11,047,568 B2
(45) Date of Patent: Jun. 29, 2021

(54) METHOD FOR OPERATING A FLUIDIZED BED BOILER (71) Applicant: Improbed AB, Malmo (SE)

(72) Inventors: Bengt-Ake Andersson, Molnlycke (SE); Fredrik Lind, Torslanda (SE); Henrik Thunman, Partille (SE)

(73) Assignee: Improbed AB, Malmö (SE)

( * ) Notice: Subject to any disclaimer, the term of this patent is extended or adjusted under 35 U.S.C. 154(b) by 184 days.

(21) Appl. No.: 15/735,437

(22) PCT Filed: Jun. 7, 2016

(86) PCT No.: PCT/EP2016/062887
§ 371 (c)(1),
(2) Date: Dec. 11, 2017

(87) PCT Pub. No.: WO2016/202641
PCT Pub. Date: Dec. 22, 2016

(65) Prior Publication Data
US 2018/0180281 A1   Jun. 28, 2018

(30) Foreign Application Priority Data

Jun. 15, 2015  (EP) .................................... 15172219
Jun. 25, 2015  (EP) .................................... 15173901

(51) Int. Cl.
*F23C 10/10*    (2006.01)
*F23G 5/30*     (2006.01)
(Continued)

(52) U.S. Cl.
CPC .............. *F23C 10/10* (2013.01); *F23C 10/18* (2013.01); *F23C 10/20* (2013.01); *F23G 5/30* (2013.01);
(Continued)

(58) Field of Classification Search
CPC .................................. F23C 10/18; F23C 10/10
See application file for complete search history.

(56) References Cited

U.S. PATENT DOCUMENTS 3,764,651 A    10/1973  Henkel et al.
3,879,530 A *   4/1975  Perret ..................... C01B 17/54
                                                   423/543

(Continued)

FOREIGN PATENT DOCUMENTS

CN    103031433    7/2014
CN    203794844 U  8/2014
(Continued)

OTHER PUBLICATIONS

Acharya et al. Heavy minerals placer deposits of Ekakula beach, Gahiramatha coast, Orissa, India. Resource Geology 1998; 48(2):125-136.
(Continued)

*Primary Examiner* — Jason Lau
(74) *Attorney, Agent, or Firm* — Casimir Jones, S.C.; Brian F. Bradley (57)   ABSTRACT

The invention relates to a method for operating a fluidized bed boiler, comprising: a) setting the ratio of secondary oxygen containing gas to primary oxygen containing fluidizing gas to a value ranging from 0.0 to 0.8; b) carrying out the combustion of fuel with a fluidized bed comprising ilmenite particle; and to a fluidized bed boiler.

11 Claims, 5 Drawing Sheets

(51) Int. Cl.
*F23C 10/18* (2006.01)
*F23N 3/00* (2006.01)
*F23C 10/20* (2006.01)
*F23N 1/00* (2006.01)

(52) U.S. Cl.
CPC ............... *F23N 1/00* (2013.01); *F23N 3/00* (2013.01); *F23C 2900/10001* (2013.01); *F23C 2900/99008* (2013.01); *F23N 2237/16* (2020.01); *F23N 2237/18* (2020.01); *Y02E 20/34* (2013.01)

(56) References Cited

U.S. PATENT DOCUMENTS

| | | | |
|---|---|---|---|
| 3,964,675 A | | 6/1976 | Euchner, Jr. |
| 4,457,289 A | * | 7/1984 | Korenberg ............... B01J 8/32 110/245 |
| 4,716,856 A | * | 1/1988 | Beisswenger ......... B01J 8/0055 110/245 |
| 4,843,981 A | | 7/1989 | Goldbach et al. |
| 4,960,057 A | | 10/1990 | Ohshita et al. |
| 6,808,390 B1 | * | 10/2004 | Fung ....................... C10B 49/10 110/245 |
| 2004/0237909 A1 | | 12/2004 | Krebs |
| 2008/0149012 A1 | * | 6/2008 | Dernjatin ............... F23C 10/00 110/245 |
| 2010/0037512 A1 | * | 2/2010 | Durand ................... A01M 1/023 43/139 |
| 2013/0180244 A1 | * | 7/2013 | Cheng .................... F01K 13/003 60/664 |
| 2013/0323654 A1 | | 12/2013 | Ruottu |
| 2018/0180282 A1 | | 6/2018 | Andersson et al. |

FOREIGN PATENT DOCUMENTS

| | | |
|---|---|---|
| DE | 4007635 | 9/1991 |
| EP | 0185931 | 7/1986 |
| EP | 1013994 | 6/2000 |
| EP | 2762781 | 8/2014 |
| EP | 3037724 A1 | 6/2016 |
| NZ | 196064 | 1/1986 |
| WO | WO 2016/202639 | 12/2016 |
| WO | WO 2016/202640 | 12/2016 |
| WO | WO 2016/202641 | 12/2016 |

OTHER PUBLICATIONS

Corcoran, An analysis of ilmenite particles used as bed material for combustion of biomass in a CFB boiler, Master's Thesis in Sustainable Energy Systems, Chalmers University of Technology, Gothenburg, Sweden, 2013, T2013-397, 51 pages.

Filippou et al., Iron removal and recovery in the titanium dioxide feedstock and pigment industries. JOM 2009; 61(10):36-42.

Thunman et al., Using an oxygen-carrier as bed material for combustion of biomass in a 12-MWth circulating fluidized-bed boiler. Fuel Nov. 2013;113:300-309.

International Search Report and Written Opinion for PCT/EP2016/062885, dated Jan. 18, 2017, 13 pages.

International Search Report and Written Opinion for PCT/EP2016/062886, dated Aug. 17, 2016, 8 pages.

International Search Report and Written Opinion for PCT/EP2016/062887, dated Sep. 13, 2016, 10 pages.

* cited by examiner

METHOD FOR OPERATING A FLUIDIZED BED BOILER

The invention is in the technical field of fluidized bed combustion and relates to a method for operating a fluidized bed boiler and to a fluidized bed boiler.

In fluidized bed combustion (FBC) the fuel is suspended in a hot fluidized bed of solid particulate material, typically silica sand. In this technique a fluidizing gas is passed with a specific fluidization velocity through a solid particulate bed material, which typically is silica sand. The bed material serves as a heat carrier to promote rapid heat transfer. At very low gas velocities, the bed remains static. Once the velocity of the fluidization gas rises above the minimum fluidization velocity at which the force of the fluidization gas balances the gravity force acting on the particles, the solid bed material behaves in many ways similar to a fluid and the bed is said to be fluidized. In bubbling fluidized bed (BFB) boilers, the fluidization gas is passed through the bed material to form bubbles in the bed, facilitating the transport of the gas through the bed material and allowing for a better control of the combustion conditions (better temperature and mixing control) when compared with grate combustion. In circulating fluidized bed CFB boilers the fluidization gas is passed through the bed material at a fluidization velocity where the majority of the particles is carried away by the fluidization gas stream. The particles are then separated from the gas stream, e.g. by means of a cyclone, and circulated back into the furnace, usually via a loop seal.

Usually an oxygen containing gas, typically air or a mixture of air and recirculated flue gas, is used as the fluidizing gas (so called primary oxygen containing gas or primary air) and passed from below the bed through the bed material, thereby acting as a source of oxygen required for combustion.

The ability of mixing fuel and oxygen in time and space of a combustor is one of the most critical parameters for reaching high combustion efficiency and low emission of harmful species. The most common strategy for achieving sufficient mixing and an adequate fuel conversion in commercially fired boilers, is to operate the furnace with a variety of feeding ports for injecting oxygen containing gas (so called secondary oxygen containing gas, typically air) into the furnace. The feeding ports are distributed in strategic positions (generally in the freeboard) along the furnace in order to facilitate mixing of fuel and oxygen, resulting in a complex boiler design. The amount of secondary oxygen containing gas that needs to be fed to the furnace depends on the boiler type (CFB or BFB) and the type of the fuel used. Generally the more inhomogeneous and volatile rich a given fuel, the more secondary oxygen containing gas is needed. Also, higher fuel loads require higher amounts of secondary oxygen containing gas to achieve adequate mixing of fuel and oxygen. In practice, the amount of secondary oxygen containing gas that is required can be quite high.

It is not trivial to achieve good in-mixing of the secondary oxygen containing gas into the main gas stream. In most cases, the effect "streaking" occurs. The phenomenon of streaking is coupled to poor homogeneous mixing between the hot gases inside the furnace and the cold oxygen containing gas (typically cold air) which is fed as secondary oxygen containing gas. The natural cause for this is the difference in viscosity between the cold and hot gas and the geometrical restrictions in feeding air in the whole reactor volume. The streaking behavior leads to local zones which can be very high in oxygen concentration. These zones in combination with unconverted fuel can lead to elevated temperatures, which have been measured during experiments to as much as 350° C. over temperature. These locally high temperatures induce the melting of complex ash components that stick to the furnace wall and the heat transfer surfaces down-stream the furnace leading to fouling, corrosion issues and elevated maintenance costs. Poor mixing on the one hand leads to oxygen-rich streaks producing local hot zones and on the other hand to oxygen-depleted streaks producing CO emissions and in the worst case local corrosion. Poor mixing is also the reason why the cyclones far too often work as after-burner chambers with high maintenance costs as a result.

The object of the invention is to provide a method for operating a fluidized bed boiler which allows for good mixing of fuel and oxygen and reduces the disadvantages mentioned above.

This object is solved by the features of the independent claims. Advantageous embodiments are defined in the dependent claims.

The invention provides a method for operating a fluidized bed boiler, comprising:
  a) setting the ratio of secondary oxygen containing gas to primary oxygen containing fluidizing gas to a value ranging from 0.0 to 0.8;
  b) carrying out the combustion of fuel with a fluidized bed comprising ilmenite particles.

From the prior art it is known to use ilmenite as fluidized bed material in the CFB process (H. Thunman et al., Fuel 113 (2013) 300-309). The natural occurring mineral ilmenite consists mainly of iron titanium oxide ($FeTiO_3$) which can be repeatedly oxidized and reduced and thus acts as a redox material. Due to this reducing-oxidizing feature of ilmenite, the material can be utilized as an oxygen carrier to improve the mixing of oxygen and fuel in circulating fluidized bed (CFB) combustion and the prior art has reported that the CFB process can be carried out at lower air-to-fuel ratios when the bed material comprises ilmenite particles. The term air to fuel ratio ($\lambda$) is commonly understood in the art and denotes the amount of air that is fed in relation to the fuel in a combustion unit. It is defined as the ratio determined by the oxygen provided to the furnace for combustion divided by the oxygen needed for stoichiometric combustion and given as $$\lambda = \frac{m_{oxygen, provided}}{m_{oxygen, stoichiometry}}$$

where $m_{oxygen, provided}$ is the total mass of oxygen that is fed as combustion air to the furnace; and $m_{oxygen, stoichiometry}$ is the mass of oxygen which is needed to reach stoichiometric combustion of the fuel fed to the furnace.

The invention has recognized that a fluidized bed comprising ilmenite particles provides sufficient mixing of oxygen and fuel to carry out the combustion process with a reduced or even removed need for secondary oxygen containing gas. The combustion of a given fuel can therefore be carried out at significantly lower ratios of secondary oxygen containing gas to primary oxygen containing fluidizing gas than what is possible with conventional bed material, such as silica sand. This in turn can greatly reduce (and in the case of no secondary oxygen feeding even avoid) the disadvantages associated with feeding secondary oxygen containing gas to the furnace.

The solution was unexpected because the lower air to fuel ratios obtained with ilmenite as bed material in the prior art were reached requiring the same constant ratio of fed secondary air to fed primary air as for a silica-sand only fluidized bed inventory, suggesting that essentially the same distribution of secondary to primary air is needed to exploit the oxygen carrying capabilities of ilmenite. By contrast, the invention has surprisingly found that the oxygen carrying capabilities of ilmenite are sufficient, in particular even at a low gaseous oxygen content in the furnace, to significantly reduce or even remove the secondary oxygen containing gas feeding to the furnace.

First, several terms are explained in the context of the invention.

Primary oxygen containing gas is the gas used for fluidizing the bed material in the boiler. Primary oxygen containing fluidizing gas is commonly injected into the furnace via an array of nozzles below the bed. In the context of the invention, the term secondary oxygen containing gas refers to all oxygen containing gas fed into the furnace for the combustion of fuel which is not primary fluidizing gas. Secondary oxygen containing gas is generally injected into the furnace via nozzles located throughout the furnace, in particular throughout the freeboard (upper part) of the furnace. Preferably, the primary and/or secondary oxygen containing gas can be air.

The ratio of secondary oxygen containing gas to primary oxygen containing gas is defined as the ratio of mass flows (usually described in industrial applications as normal cubic meter of oxygen containing gas per second) of secondary oxygen containing gas to primary oxygen containing gas. In the inventive method of operating a circulating fluidized bed boiler, the ratio of secondary oxygen containing gas to primary oxygen containing fluidizing gas is set to a value ranging from 0.0 to 0.8. This range includes the case where the ratio of secondary oxygen containing gas to primary oxygen containing fluidizing gas is set to 0.0, i.e. where no secondary oxygen containing gas is supplied to the furnace.

The invention allows to operate fluidized bed boilers with significantly lowered ranges for the ratio of secondary oxygen containing gas to primary oxygen containing fluidizing gas as compared to the use of conventional bed material, such as silica sand. In preferred embodiments the ratio of secondary oxygen containing gas to primary oxygen containing fluidizing gas is set to a value ranging from 0.0 to 0.7, preferably to a value ranging from 0.0 to 0.65, more preferably to a value ranging from 0.0 to 0.4, more preferably to a value ranging from 0.0 to 0.3. Most preferably the ratio of secondary oxygen containing gas to primary oxygen containing fluidizing gas is set to 0.

Further preferred embodiments are characterized by the following features:
  the fuel comprises biomass and the ratio of secondary oxygen containing gas to primary oxygen containing fluidizing gas is set to a value ranging from 0.0 to 0.7, further preferably ranging from 0.0 to 0.65, further preferably ranging from 0.0 to 0.5, further preferably ranging from 0.0 to 0.4, further preferably ranging from 0.0 to 0.3, further preferably ranging from 0.0 to 0.2, further preferably ranging from 0.0 to 0.1; and/or
  the fuel comprises waste and the ratio of secondary oxygen containing gas to primary oxygen containing fluidizing gas is set to a value ranging from 0.0 to 0.65, further preferably ranging from 0.0 to 0.5, further preferably ranging from 0.0 to 0.4, further preferably ranging from 0.0 to 0.3, further preferably ranging from 0.0 to 0.2, further preferably ranging from 0.0 to 0.1.

The invention is based on replacing a fraction or all of the conventional inert bed material by the oxygen-carrying mineral ilmenite. In the context of the invention, the term bed material describes material intended to create the fluidized bed in the system. The term fuel describes the materials that are to be combusted in the fluidized bed process and comprises any fuel known to be combustible in fluidized bed boilers, in particular biomass and waste-based fuel, such as municipal and industrial waste. Typical fuel materials are wood, agricultural biomass, sludge and coal.

Preferably, the ilmenite particles make up at least 10 wt. %, preferably at least 20 wt. %, more preferably at least 30 wt. %, more preferably at least 40. wt. %, more preferably at least 50 wt. %, more preferably at least 60 wt. %, more preferably at least 75 wt. %, more preferably at least 80 wt. %, more preferably at least 85 wt. %, more preferably at least 90 wt. %, more preferably at least 95 wt. %, most preferably 100 wt. % of the weight of the bed material. The remaining bed material can be any conventional bed material known to be suitable for fluidized bed boilers, preferably silica sand. Preferably, the ilmenite particles are selected from the group comprising sand ilmenite and rock ilmenite.

Preferably, the fluidized bed boiler is a circulating fluidized bed (CFB) boiler or a bubbling fluidized bed boiler (BFB).

When the fluidized bed boiler is a circulating fluidized bed boiler, it is preferred that the average particle size of the ilmenite particles is between 50 μm and 400 μm, more preferably between 100 μm and 300 μm. In a particularly preferred embodiment, the bed consists of ilmenite particles with an average particle size between 100 μm and 300 μm.

When the fludized bed boiler is a bubbling fluidized bed (BFB) boiler, it is preferred that the ilmenite particles have an average particle size between 0.1 mm and 1.8 mm. The average particle size of the ilmenite particles can further preferably be at least 0.2 mm, more preferably at least 0.3 mm, most preferably at least 0.4 mm. Preferably, the average particle size of the ilmenite particles is not more than 1.8 mm, more preferably not more than 1.0 mm, most preferably not more than 0.6 mm. In the context of the invention, each lower limit can be combined with each upper limit to define an average particle size range. Preferred ranges for the average ilmenite particle size in the BFB process are 0.2-1.8 mm, 0.3-1.0 mm and 0.4-0.6 mm, wherein the range of 0.4-0.6 mm is particularly preferred. Preferably, the particle size of the ilmenite particles in the BFB process can be in the range from 0.1 mm to 1.8 mm, more preferrably in the range from 0.3 mm to 1.0 mm. In the context of the invention, any particle size range can be combined with any range for the average particle size.

In preferred embodiments, the boiler is a bubbling fluidized bed (BFB) boiler and
  i) the average particle size of the ilmenite particles is at least 0.2 mm, preferably at least 0.3 mm, most preferably at least 0.4 mm; and not more than 1.8 mm, preferably not more than 1.0 mm, most preferably not more than 0.6 mm; and/or
  ii) the ilmenite particles have a particle size in the range from 0.1 mm to 1.8 mm, preferably in the range from 0.3 mm to 1.0 mm.

In the context of the invention particle size (dp) can be measured by mechanical sieving. The mass captured on each sieve is weighed and the average particle size ($<dp>$) is calculated as mass weighted average value.

Preferred embodiments of the method comprise supplying oxygen to the furnace in an amount to keep the oxygen concentration in the flue gas above a lower value of 0.8 vol. % and below an upper value of 5 vol. % (based on dry gas). Preferred ranges further are above a lower value of 1.0 vol.

% and below an upper value of 4.5 vol. %, further preferably above a lower value of 1.3 vol. % and below an upper value of 4.0 vol. %. These ranges are lower than the ranges that can be reached with conventional bed material such as silica sand. The invention has recognized that the use of ilmenite particles as bed material provides the benefits of a reduced or even removed secondary oxygen containing gas feed even at low amounts of gaseous oxygen in the furnace. The oxygen content in the flue gas depends on the amount of oxygen fed to the furnace. The invention has recognized that by monitoring the oxygen concentration in the flue gas and supplying oxygen to the furnace in an amount to keep the oxygen concentration in the flue gas within a specified range further improves the efficiency of the combustion process.

The oxygen content in the flue gas is routinely measured in commercially fired fluidized bed boilers, where it is used to monitor the combustion process. It may typically be measured by an in-situ located lambda probe (zirconia cell) e.g., upstream the economizer, or by using paramagnetic sensors.

The values for the oxygen concentration depend on the type of fuel used. More inhomogeneous fuel (such as municipal solid waste) requires operating at a larger oxygen concentration in the flue gas as more homogenous fuel (such as biomass, e.g. wood chips). Preferred embodiments are characterized by the following features:
  the fuel comprises coal and oxygen is supplied to the furnace in an amount to keep the oxygen concentration in the flue gas above a lower value of 0.8 vol. % and below an upper value of 2.5 vol. %, preferably above a lower value of 0.8 vol. % and below an upper value of 2.0 vol. %, more preferably above a lower value of 1.3 vol. % and below an upper value of 1.8 vol. %, more preferably above a lower value of 1.5 vol. % and below an upper value of 1.8 vol. %;
  the fuel comprises biomass and oxygen is supplied to the furnace in an amount to keep the oxygen concentration in the flue gas above a lower value of 1.0 vol. % and below an upper value of 3.5 vol. %, preferably above a lower value of 1.0 vol. % and below an upper value of 3.0 vol. %, more preferably above a lower value of 1.3 vol. % and below an upper value of 3.0 vol. %, more preferably above a lower value of 1.5 vol. % and an upper value of 3.0 vol. %, more preferably above a lower value of 2.0 vol. % and below an upper value of 3.0 vol. %; more preferably above a lower value of 1.3 vol. % and below an upper value of 2.5 vol. %;
  the fuel comprises waste-based fuel and oxygen is supplied to the furnace in an amount to keep the oxygen concentration in the flue gas above a lower value of 2.5 vol. % and below an upper value of 5.0 vol. %, preferably above a lower value of 3.0 vol. % and below an upper value of 5.0 vol. %; more preferably above a lower value of 3.5 vol. % and below an upper value of 5.0 vol. %; more preferably above a lower value of 3.0 vol. % and below an upper value of 4.0 vol. %.

The invention has further recognized that the above described benefits of a reduced secondary oxygen containing gas feed when the bed comprises ilmenite particles can be realized with low excess air ratios. In preferred embodiments, the method for operating a fluidized bed boiler therefore can comprise setting the excess air ratio ($\lambda$) to a value below 1.3.

The excess air ratio is mathematically equivalent to the air to fuel ratio.

In further preferred embodiments, $\lambda$ is 1.25 or less, more preferably 1.2 or less, more preferably 1.1 or less, most preferably between 1.05 and 1.1. Preferably, for the combustion of waste-based fuel, $\lambda$ is 1.23 or less, more preferably 1.1 or less, more preferably between 1.05 and 1.23, most preferably between 1.05 and 1.1. For the combustion of biomass fuel, $\lambda$ preferably is 1.19 or less, more preferably 1.1 or less, more preferably between 1.05 and 1.19, most preferably between 1.05 and 1.1.

The invention further provides added flexibility to the operation of a fluidized bed boiler and in particular enables flexible load operation. Boilers that can operate at different fuel loads and change between different fuel loads in a flexible manner are increasingly important for safeguarding a stable heat and/or power and/or steam supply. In particular for boilers which are operated to provide heat and power, flexible load operation can be very desirable. The energy demand is increasingly covered by energy from renewable resources, e.g. wind generated energy or solar energy (so called green energy). Wind energy or solar energy, however, are intermittent energy sources, since they depend on sufficient wind or sunshine. Energy from these intermittent sources may therefore not be reliably available to the power grid and shortfalls or peaks from intermittent energy supplies must be balanced with other energy sources to retain a stable energy supply and stable power grid operation. Fluidized bed boilers that allow for flexible load operation may contribute to this balancing in that the load can be decreased in times of low demand and flexibly increased if the demand suddenly rises again. Furthermore, fluidized bed boilers with flexible load capabilities which are only operated for heat generation may also be a powerful tool to balance a district heating system during parts of the year when the demand curve is oscillating due to great temperature differences during night and day time.

The ability to establish sufficient operation during reduced fuel load is coupled to the potential of keeping up the solids circulation and thereby the heat transfer within the system. One example of this are the so called tertiary super-heaters for the final superheating of the steam which are commonly placed in the loop-seals of the cyclone legs. If the solids circulation is too low it will not be possible to finalize the tertiary superheating step. Generally, increased amounts of primary air are needed when operating the boiler at part load as compared to full load, since at part load solid fuel particles have a greater tendency to stick together, resulting in uneven combustion conditions.

The invention has recognized that if the flow of secondary air can be directed to the primary air stream this clearly increases the ability to keep up the solids circulation and thereby creating flexibility for part load operation. In particular for very heterogeneous fuel, for which large amounts of secondary air are needed, the lower limit for part load operation can thus be greatly reduced.

In preferred embodiments, the method therefore further comprises:
  a) changing the fuel load; and
  b) adjusting the ratio of secondary oxygen containing gas to primary oxygen containing fluidizing gas in response to a change in the fuel load.

Preferably, the ratio of secondary oxygen containing gas to primary oxygen containing fluidizing gas is lowered in response to a reduction in the fuel load; and/or the ratio of secondary oxygen containing gas to primary oxygen containing fluidizing gas is raised in response to an increase in the fuel load.

In particularly preferred embodiments, the ratio of secondary oxygen containing gas to primary oxygen containing fluidizing gas is set to zero in response to a reduction in the fuel load.

In the context greater load flexibility it is preferred that the amount of primary oxygen containing fluidizing gas is increased while the amount of secondary oxygen containing gas is decreased, preferably such that the total amount of oxygen containing gas that is fed into the furnace remains essentially constant. In preferred embodiments the fuel load is reduced by 10%, preferably by 25%, further preferably by 50%, further preferably by 70% and/or wherein the fuel load is increased by 10%, preferably by 25%, further preferably by 50%, further preferably by 70%, further preferably by 100%, further preferably by 200% further preferably by 300%. In particularly preferred embodiments the fuel is biomass; and/or the boiler is operated to generate heat and power.

In an advantageous embodiment of the inventive method, the oxygen containing gas can be air and preferably all the air supplied to the furnace is provided as primary fluidizing air.

In a preferred embodiment of the inventive method, the bed material consists of ilmenite particles; and the lower value for the oxygen content is 1.3 vol. % and the upper value for the oxygen content is 2.5 vol. %; and preferably all oxygen containing gas is provided to the furnace as primary oxygen containing fluidizing gas.

The invention also concerns a fluidized bed boiler, wherein all of the ports for injecting oxygen containing gas into the furnace are primary injection ports. This means, that all of the ports for injecting oxygen containing gas into the furnace are ports through which primary fluidizing gas is injected into the furnace. Preferably, the oxygen containing gas is air. The fluidized bed boiler can preferably comprise a fluidized bed comprising ilmenite particles as defined above in the context of the inventive method. Preferably, the ilmenite particles can be selected from the group consisting of rock ilmenite particles and sand ilmenite particles. The fluidized bed boiler can preferably be selected from the group consisting of BFB boilers and CFB boilers.

In the following, advantageous embodiments will be explained by way of example.

It is shown in

EXAMPLE 1

CFB Boiler Operation

Figure 7:
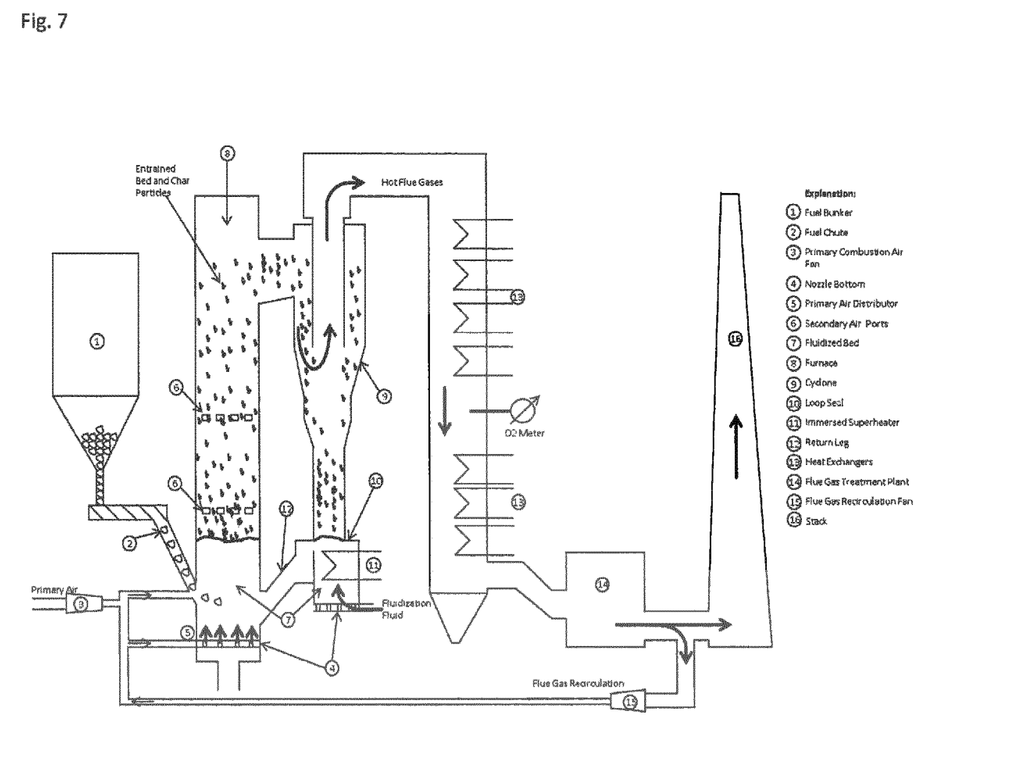
FIG. 7: a schematic drawing of a CFB boiler.

By way of example, FIG. 7 shows a typical CFB boiler. The reference numerals denote:

1 Fuel Bunker
2 Fuel Chute
3 Primary Combustion Air Fan
4 Nozzle Bottom
5 Primary Air Distributor
6 Secondary Air Ports
7 Fluidized Bed
8 Furnace
9 Cyclone
10 Loop seal
11 Immersed Superheater
12 Return Leg
13 Heat Exchangers
14 Flue Gas Treatment Plant
15 Flue Gas Recirculation Fan
16 Stack During normal operation, fuel is stored in the fuel bunker (1) and can be fed to the furnace (8) via a fuel chute (2). Alternative means for fuel feeding (not shown) are for example screw feeders and rotary valves, not excluding others. The fluidization gas, in this case for example air, is fed to the furnace (8) as primary combustion air via the primary air distributor (5) from below the bed. Entrained particles are carried away by the fluidization gas stream and are then separated from the gas stream using a cyclone (9) and circulated back into the furnace (8) via a loop seal (10). Additional combustion air (so called secondary air) can be fed into the furnace to enhance the mixing of oxygen and fuel. To this end, secondary air ports (6) are located throughout the furnace, in particular the freeboard (upper part of the furnace).

The CFB boiler can be operated using the inventive method, by
a) setting the ratio of secondary oxygen containing gas to primary oxygen containing fluidizing gas to a value ranging from 0.0 to 0.8;
b) carrying out the combustion of fuel with a fluidized bed comprising ilmenite particles.

EXAMPLE 2

Operating the Chalmers Boiler without Secondary Air Feeding

Figure 1:
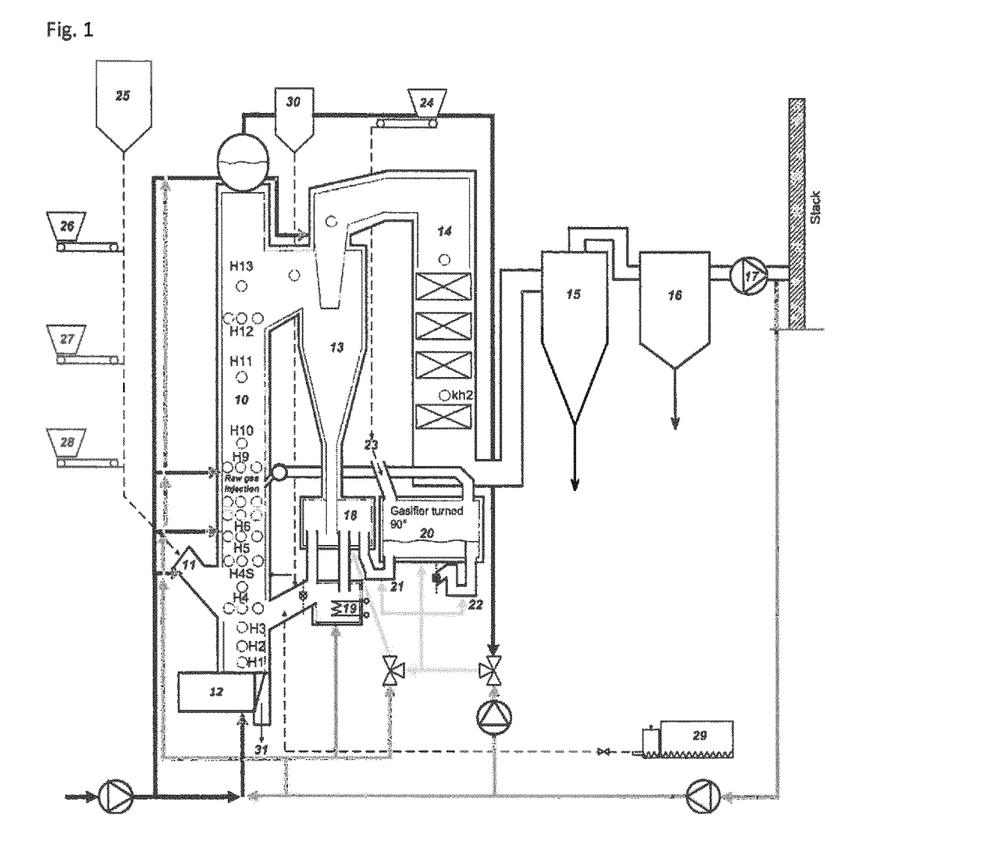
FIG. 1: a schematic drawing of the 12 $MW_{th}$ CFB boiler used for CFB experiments.
Figure 2:
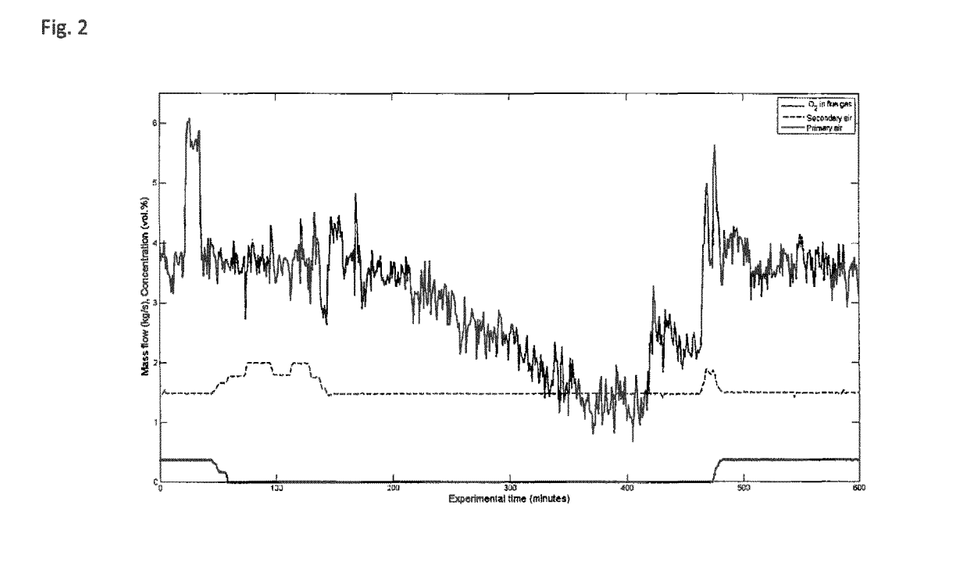
FIG. 2: the mass flow of primary and secondary air and the oxygen concentration in the flue gases vs. time during operation in a 12 $MW_{th}$ CFB boiler.

The Chalmers 12 MWth CFB-boiler setup is shown in FIG. 1, wherein reference numerals indicate:

10 furnace
11 fuel feeding (furnace)
12 wind box
13 cyclone
14 convection path
15 secondary cyclone
16 textile filter
17 fluegas fan
18 particle distributor
19 particle cooler
20 gasifier
21 particle seal 1
22 particle seal 2
23 fuel feeding (gasifier)
24 fuel hopper (gasifier)
25 hopper
26 fuel hopper 1
27 fuel hopper 2
28 fuel hopper 3
29 sludge pump
30 hopper
31 ash removal
32 measurement ports The boiler is operated using rock ilmenite as bed material with only primary air for more than 500 minutes during dynamic changes in the air-to-fuel-ratio as indicated by the oxygen content in the flue gas. This experiment is initiated during ordinary CFB air feeding conditions, i.e. both primary and secondary air is fed to the furnace. FIG. 2 shows the mass flows of primary and secondary air and the oxygen concentration in the flue gases during 600 minutes of operation using wood-chips as fuel. The O2-concentration in the flue gases is measured by two separate standard online gas analysis instruments, using paramagnetic sensors.

During the start of this experiment, the air for the fuel spreader is turned off and the secondary/primary air ratio is around 0.24 and the boiler is operated slightly below 4 vol. % of oxygen ($O_2$) in the flue gases, as can be seen from FIG. 2. After around 50 minutes of operation the secondary air is reduced in two steps until the valve for secondary air feeding is closed. The changes are clearly shown in FIG. 2, where the primary air increases with equal amount as the removed flow of total secondary air. In this experiment the mass flow of primary air should be kept the same as during the start of the experiment to yield the same gas velocity and bed material circulation. This is done by decreasing the total air and compensating the fuel feeding to reach the same $O_2$ concentration in the flue gases as in the start of the experiment. These settings are kept for around 20 minutes before any changes are made.

Figure 3:
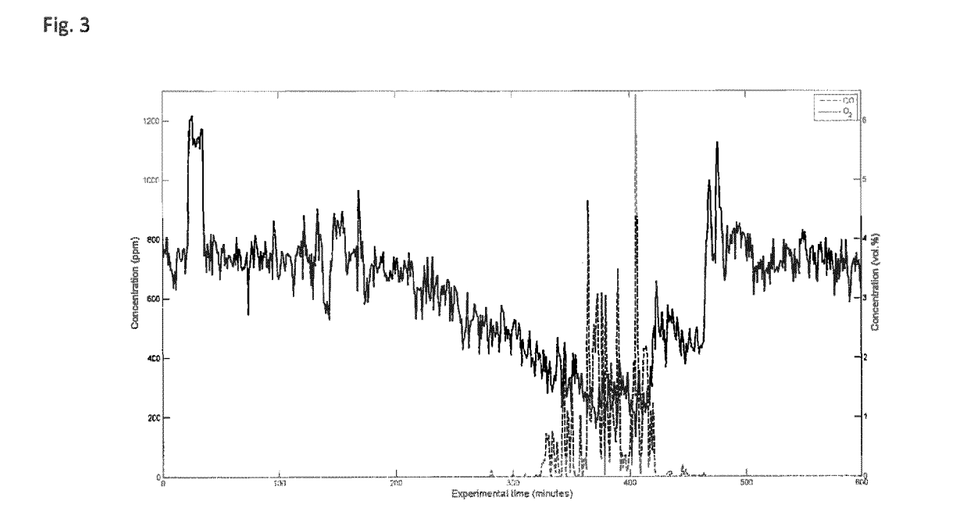
FIG. 3: the concentration of carbon monoxide and oxygen in the flue gases vs. time during operation in a 12 $MW_{th}$ CFB boiler.

FIG. 3 shows the concentrations of CO and $O_2$ during the experiment. As can be seen no carbon monoxide (CO) is detected at the $O_2$ concentration of slightly below 4 vol. % even though no secondary air is fed to the boiler (i.e., the secondary air to primary air ratio is 0.0). From FIGS. 2 and 3 it can be seen that the $O_2$ in the flue gases can be lowered to around 2 vol. % without any constant CO concentrations detected in the flue gases. This proves that the oxygen-carrying properties of ilmenite are sufficient to enable the total removal of secondary air even at a lower air-to-fuel-ratio. It should be noted that non oxygen-carrying bed material such as e.g. silica-sand, does not allow operation at such low oxygen concentrations even if the operation is conducted with both primary and secondary air.

EXAMPLE 3

Figure 4:
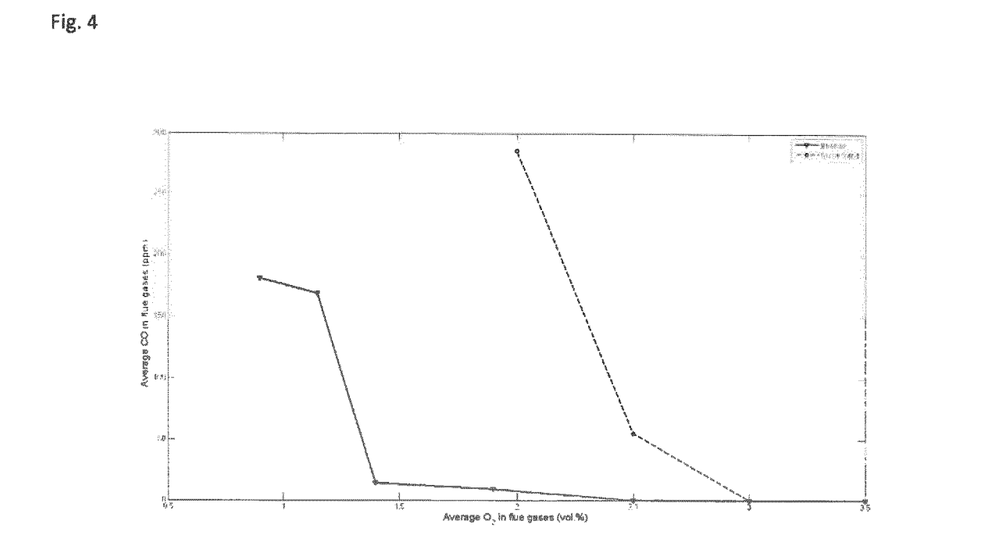
FIG. 4: carbon monoxide concentrations for rock ilmenite and silica sand as bed material during dynamic changes of the air to fuel ratio in a CFB boiler.

FIG. 4 shows the result from a similar experiment where the air-to-fuel-ratio has been dynamically changed during operation with solely rock ilmenite and during operation with solely silica-sand as bed material in the Chalmers CFB-boiler. During this experiment, both primary and secondary air is fed to the boiler. As can be seen from FIG. 3 when silica-sand is used as bed material there is CO present already when the $O_2$ in the flue gases is around 3 vol. % and at 2.5 vol. % of $O_2$ the CO concentration is already higher than the restrictions for normal CO emissions in this boiler. This can be compared with the rock ilmenite operation, where the restrictions for CO emissions is violated first at around 1.3 vol. % $O_2$ in the flue gases.

This shows that even though the boiler operation with silica sand as bed material is conducted with both primary and secondary air, silica-sand as bed material does not allow the boiler to be run at the low $O_2$ concentrations in the flue gas that can be reached with ilmenite as bed material and no secondary air feeding, as shown in Example 1.

EXAMPLE 4

1) Setup Used for BFB Experiments

A 2-4 $MW_{th}$ gasifier system at Chalmers University of Technology was used for BFB combustion experiments with ilmenite. It is of the type indirect gasification. In this technique, the actual gasification reactions are separated from the combustion reactions and the heat needed for the endothermic gasification reactions is supplied by a hot circulating bed material. The bubbling fluidized bed gasifier is connected to the 12 $MW_{th}$ circulating fluidized bed boiler and the two reactors are communicating via the bed material, see FIG. 1. Fuel is fed on top of the bed in the gasifier and the gasifier is fluidized with pure steam. Usually the system is operated with silica-sand and the gasifier is operated in the temperature interval of 750-830° C. FIG. 1 shows the boiler and gasifier setup.

2) Ilmenite Operation in the Gasifier

Variations in Fluidization Velocity at Constant Fuel Feed

Figure 5:
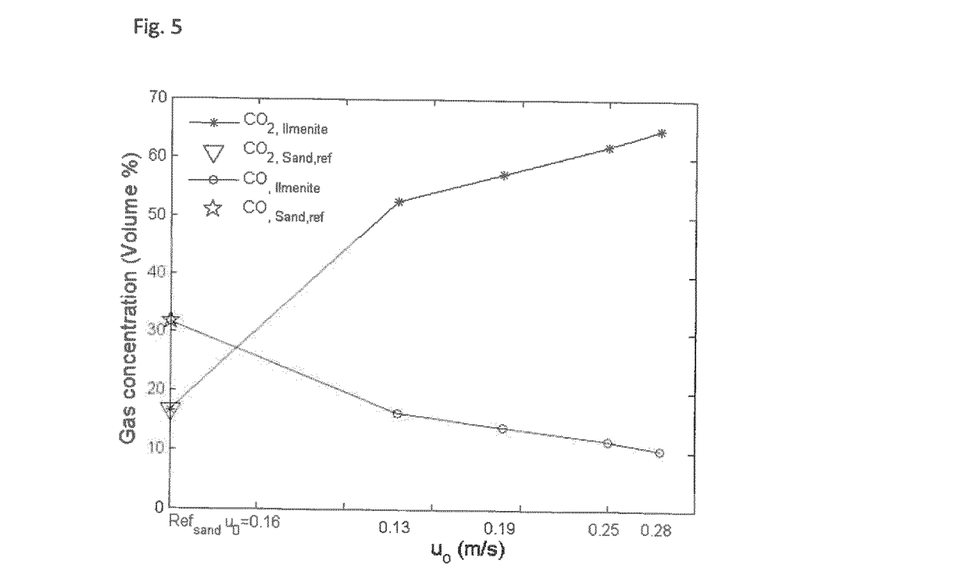
FIG. 5: CO and $CO_2$ concentration versus fluidization velocity in a BFB reactor with ilmenite and silica sand as bed material.

With the aim of investigating gas/solid contact between the volatiles and the bed material, the gasifier was operated with 100 wt. % of ilmenite with an average particle size of 0.14 mm as bed material for a few days. The first experiment was conducted at four different steam flows yielding a variety in gas velocities: 0.13, 0.19, 0.25 and 0.28 m/s, which corresponds to 5, 7, 9 and 11 times the minimum fluidization velocity of the ilmenite fraction. During this experiment the gasifier was continuously fed with 300 kg of fuel (wood-pellets) per hour and the bed temperature was kept at 820-830° C. FIG. 5 shows the analyzed gas components $CO_2$ and CO in the outlet of the gasifier during ilmenite operation. Data for ordinary silica-sand during normal gasification conditions (Ref, sand, marker color red) has been added in the figure for comparison with the ilmenite. As can be seen in FIG. 5, the CO concentration is clearly decreased and the $CO_2$ concentration is increased by almost a factor 4 when ilmenite is used in comparison to the silica-sand operation. As the gasifier is fluidized with pure steam all the extra oxygen supplied for the increased oxidation of hydrocarbons and CO is coupled to the oxygen-carrying properties of the ilmenite. This further shows the oxygen buffering effects that ilmenite possesses and the ability to transport oxygen from oxygen rich to oxygen depleted zones during fuel conversion. The fluidization conditions and gas solid contact in the gasifier can be compared to the conditions in a BFB-boiler and it is therefore likely that ilmenite will contribute with increasing oxygen transport also in a BFB boiler.

Variation in Fuel Feed During Constant Fluidization Velocity

Figure 6:
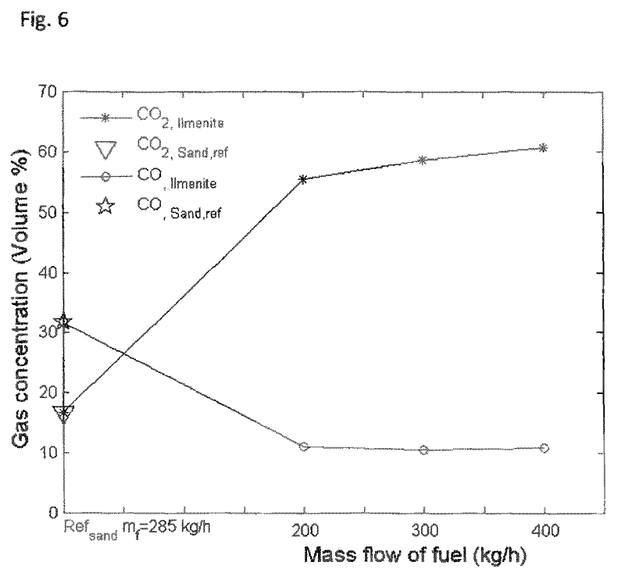
FIG. 6: CO and $CO_2$ concentration versus fuel load in a BFB reactor with ilmenite and silica sand as bed material.

The second experiment was conducted during a constant steam flow of 200 kg/h (yielding a gas velocity of 0.19 m/s, corresponding to 7 times the minimum fluidization velocity) and a variation in fuel feed: 200, 300 and 400 $kg_{fuel}$/hour (wood pellets). FIG. 6 shows the measured gas concentrations of CO and $CO_2$ in the outlet of the gasifier. The trend is very similar to the one in FIG. 5, a clearly decreasing CO concentration as a function of the oxygen transport via the ilmenite. The $CO_2$ concentration also reveals that hydrocarbons are combusted and not only CO is oxidized. This result shows that even though the fuel feed is increased from 200 to 400 kg/h there is still oxygen enough to support the oxidation of CO and hydrocarbons.

During combustion in a fluidized bed boiler, air is usually supplied both as primary air via nozzles below the bed and as secondary air in the freeboard of the furnace. The experiments in the gasifier show that a high fuel conversion can be achieved via the buffered oxygen in the ilmenite bed, i.e. without any addition of air at all. This means that a high degree of oxidation of the volatiles is conducted already in/or close to the bed and suggests the operation of a BFB boiler with less or no secondary air.

The preliminary tests indicate that an excess air ratio of 1.23 or less can be achieved for waste. It is suggested that an excess air ratio of 1.19 or less can be achieved for biomass fuel.

The invention claimed is:

1. A method for operating a fluidized bed boiler, comprising:
   setting the ratio of secondary oxygen containing gas to primary oxygen containing fluidizing gas to a value ranging from 0.0 to 0.4, wherein the primary oxygen containing fluidizing gas is provided from below the fluidized bed, and wherein the secondary oxygen containing gas comprises all oxygen containing gas fed into the boiler for the combustion of fuel that is not primary fluidizing gas;
   carrying out the combustion of fuel with a fluidized bed comprising ilmenite particles;
   changing the fuel load; and
   adjusting the ratio of secondary oxygen containing gas to primary oxygen containing fluidizing gas in response to a change in the fuel load, wherein the amount of primary oxygen containing fluidizing gas is increased while the amount of secondary oxygen containing gas is decreased such that the total amount of oxygen containing gas that is fed into the furnace remains essentially constant.

2. The method of claim 1, wherein the fuel comprises biomass and/or waste.

3. The method of any one of claim 1, further comprising supplying oxygen to the furnace in an amount to keep the oxygen concentration in the flue gas above a lower value of 0.8 vol. % and below an upper value of 5.0 vol. %.

4. The method of claim 3, characterized by one of the following features:
   the fuel comprises coal and oxygen is supplied to the furnace in an amount to keep the oxygen concentration in the flue gas above a lower value of 0.8 vol. % and below an upper value of 2.5 vol. %;
   the fuel comprises biomass and oxygen is supplied to the furnace in an amount to keep the oxygen concentration in the flue gas above a lower value of 1.0 vol. % and below an upper value of 3.5 vol. %;
   the fuel comprises waste-based fuel and oxygen is supplied to the furnace in an amount to keep the oxygen concentration in the flue gas above a lower value of 2.5 vol. % and below an upper value of 5.0 vol. %.

5. The method of claim 1, wherein
   the ratio of secondary oxygen containing gas to primary oxygen containing fluidizing gas is lowered in response to a reduction in the fuel load; and/or
   the ratio of secondary oxygen containing gas to primary oxygen containing fluidizing gas is raised in response to an increase in the fuel load.

6. The method of claim 1, wherein the ratio of secondary oxygen containing gas to primary oxygen containing fluidizing gas is set to zero in response to a reduction in the fuel load.

7. The method of claim 1, wherein the fuel load is reduced by 10% to 70% and/or wherein the fuel load is increased by 10% to 300%; and/or wherein the fuel is biomass; and/or wherein the boiler is operated to generate heat and power.

8. The method of claim 1, characterized in that the ilmenite particles make up 10 wt. % to 100 wt. % of the bed material.

9. The method of claim 1, wherein the boiler is a bubbling fluidized bed (BFB) boiler and wherein the method is characterized by one or more of the following features:
   the fuel comprises waste and the ratio of secondary oxygen containing gas to primary oxygen containing fluidizing gas is set to a value ranging from 0.0 to 0.3;
   the ilmenite particles have an average particle size between 0.1 mm and 1.8 mm; wherein
   the average particle size of the ilmenite particles is 0.2 mm to 0.6 mm; and/or
   the ilmenite particles have a particle size in the range from 0.1 mm to 1.8 mm.

10. The method of claim 1, wherein the boiler is a circulating fluidized bed (CFB) boiler and wherein the method is characterized by one or more of the following features:
    the fuel comprises biomass and/or waste and the ratio of secondary oxygen containing gas to primary oxygen containing fluidizing gas is set to a value ranging from 0.0 to 0.4;
    the ilmenite particles have an average particle size between 50 μm and 400 μm.

11. The method of claim 1, wherein the oxygen containing gas is air.

* * * * *